United States Patent
Trnka et al.

(10) Patent No.: US 11,360,264 B2
(45) Date of Patent: Jun. 14, 2022

(54) TELECOMMUNICATIONS SPLICE ARRANGEMENTS

(71) Applicant: CommScope Technologies LLC, Hickory, NC (US)

(72) Inventors: Mandy Lea Trnka, Lonsdale, MN (US); Scott L. Carlson, Bloomington, MN (US); Jaime Gonzalez Batista, Prior Lake, MN (US); Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 128 days.

(21) Appl. No.: 16/856,885

(22) Filed: Apr. 23, 2020

(65) Prior Publication Data

US 2020/0348469 A1 Nov. 5, 2020

Related U.S. Application Data

(60) Provisional application No. 62/840,595, filed on Apr. 30, 2019.

(51) Int. Cl.
*G02B 6/25* (2006.01)
*G02B 6/255* (2006.01)

(52) U.S. Cl.
CPC ......... *G02B 6/2558* (2013.01); *G02B 6/2555* (2013.01)

(58) Field of Classification Search
CPC .............................. G02B 6/2558; G02B 6/2555
USPC ........................................................ 385/99
See application file for complete search history.

(56) References Cited

U.S. PATENT DOCUMENTS

| | | | |
|---|---|---|---|
| 4,196,965 A | 4/1980 | Matsuno | |
| 5,894,536 A | 4/1999 | Rifkin et al. | |
| 7,393,148 B2 | 7/2008 | Allen et al. | |
| 7,410,308 B2 | 8/2008 | Qian et al. | |
| 8,043,013 B2 | 10/2011 | Lichoulas et al. | |
| 8,295,669 B2 | 10/2012 | Park et al. | |
| 8,696,221 B2 | 4/2014 | Vastmans et al. | |
| 10,209,447 B2 | 2/2019 | Filipowicz et al. | |
| 2009/0022457 A1* | 1/2009 | de Jong | G02B 6/3846 385/96 |
| 2009/0034916 A1 | 2/2009 | LeBlanc | |
| 2009/0324177 A1 | 12/2009 | Qian et al. | |
| 2010/0239215 A1* | 9/2010 | Mullaney | G02B 6/4475 385/100 |
| 2014/0112631 A1 | 4/2014 | Namazue et al. | |
| 2017/0031121 A1 | 2/2017 | Blazer et al. | |
| 2017/0235068 A1 | 8/2017 | Debban et al. | |
| 2019/0025516 A1 | 1/2019 | Lichoulas et al. | |

* cited by examiner

*Primary Examiner* — Jerry M Blevins
(74) *Attorney, Agent, or Firm* — Merchant & Gould P.C.

(57) ABSTRACT

The present disclosure relates to a splice arrangement. The splice arrangement may include an elongate splice protection housing that defines a channel that extends lengthwise through the elongate splice protection housing from a first end of the splice protection housing to an opposite second end of the splice protection housing. The splice arrangement may also include a first fiber optic cable and a second fiber optic cable. First optical fibers of the first fiber optic cable and second optical fibers of the second fiber optic cable may be coupled together at a splice location positioned within the channel of the elongate splice protection housing.

12 Claims, 6 Drawing Sheets

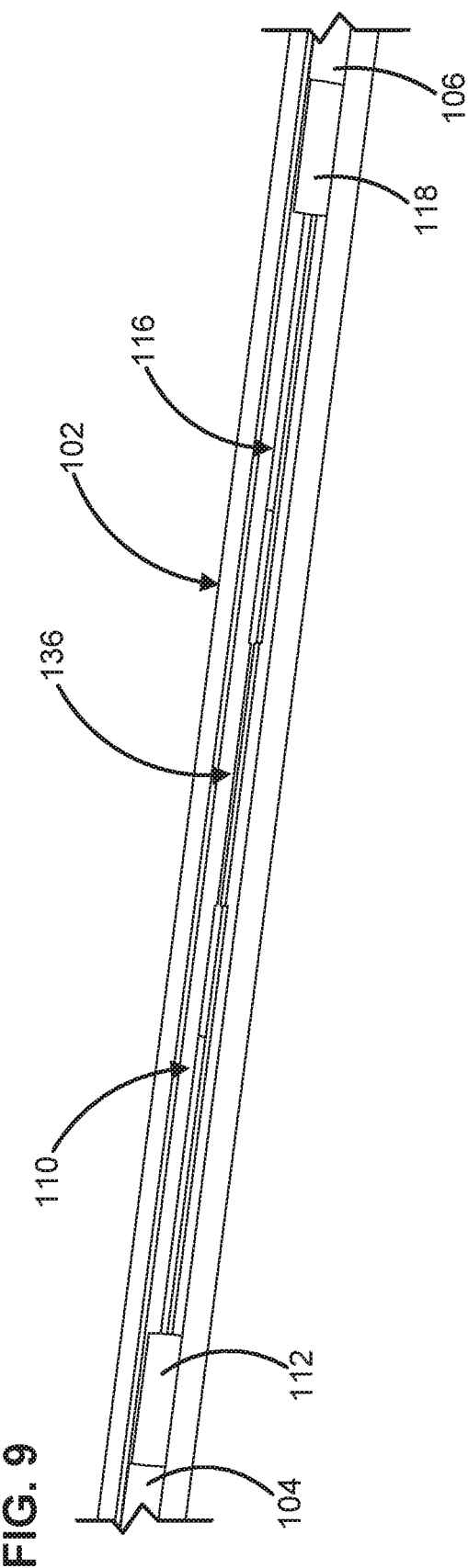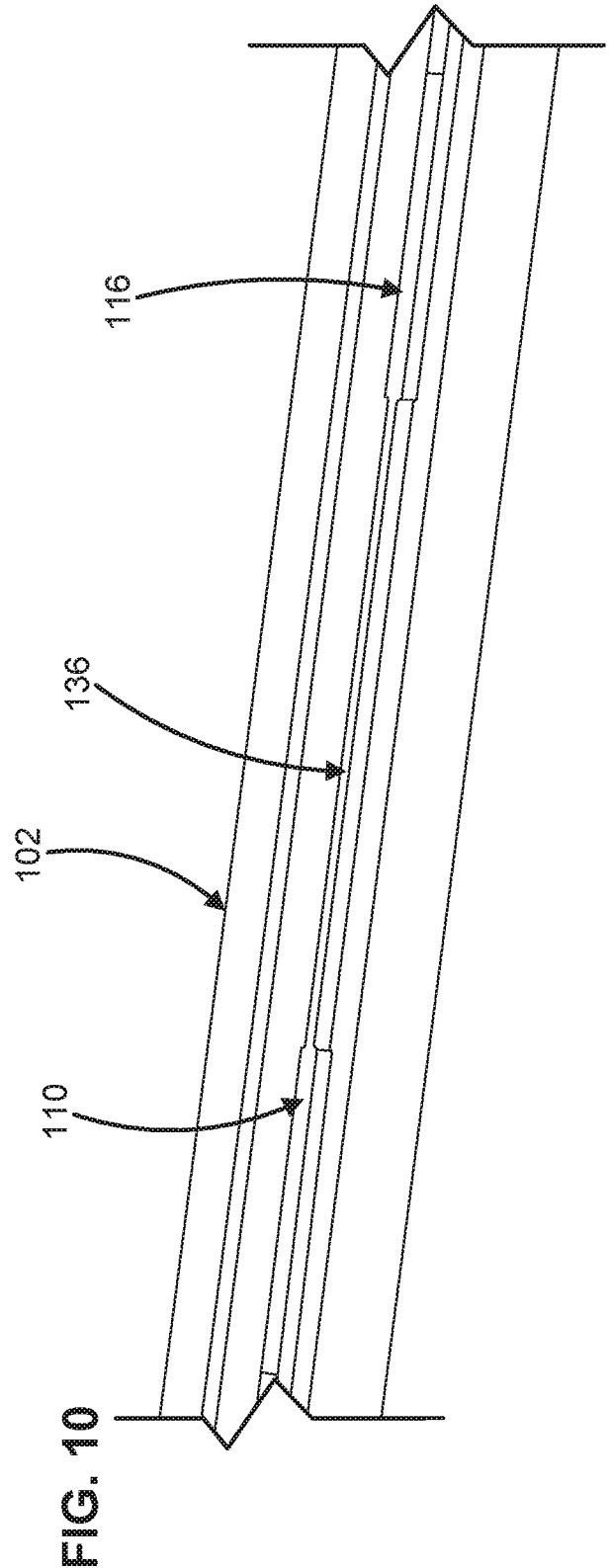

TELECOMMUNICATIONS SPLICE ARRANGEMENTS

CROSS-REFERENCE TO RELATED APPLICATION(S)

This application claims priority to U.S. Provisional Patent Application Ser. No. 62/840,595, filed on Apr. 30, 2019, the entirety of which is incorporated by reference herein.

TECHNICAL FIELD

The disclosure relates to splice arrangements used for sealing exposed optical fibers.

BACKGROUND

Optical fiber communications systems are extensively used in the telecommunications industry due to their large information carrying capacity, their virtually noise-free performance and the long span distances achievable before regeneration and amplification of the signal is required. In many communication system employing optical fibers, splice locations are provided where optical fibers are coupled together. Often these splice locations are located remote from central offices, for example, at customer premises or areas serviced by local area networks.

At each splice location, optical fibers must be separated from outer protective cable components for splicing and termination. However, removal of optical fibers from their outer protective cabling components makes the optical fibers vulnerable to damage. Protection of splice locations after splicing is an important consideration.

SUMMARY

One aspect of the disclosure relates to a splice arrangement. The splice arrangement can include an elongate splice protection housing that defines a channel that extends lengthwise therethrough from a first end to an opposite, second end of the elongate splice protection housing. The channel may have an open side that extends from the first end to the second end of the elongate splice protection housing.

The splice arrangement may also include a first fiber optic cable. The first fiber optic cable may include a first jacket that contains first optical fibers and a first fibrous reinforcing element. The first fiber optic cable may be anchored to the first end of the elongate splice protection housing by bonding the first fibrous reinforcing element to the first end of elongate splice protection housing.

The splice arrangement may further include a second fiber optic cable. The second fiber optic cable may include a second jacket that contains second optical fibers and a second fibrous reinforcing element. The second fiber optic cable may be anchored to the second end of the elongate splice protection housing by bonding the second fibrous reinforcing element to the second end of the elongate splice protection housing.

The first optical fibers and the second optical fibers may be coupled together at a splice location positioned within the channel of the elongate splice protection housing. The elongate splice protection housing may surround and support the splice location to provide structural reinforcement thereto.

Another aspect of the present disclosure relates to an elongate splice protection housing. The elongate splice protection housing may include a main body that defines a channel that extends lengthwise therethrough from a first end of the main body to an opposite, second end of the main body.

The elongate splice protection housing may include reduced-diameter portions adjacent the first and second ends of the main body and the main body may define stop shoulders adjacent the reduced-diameter portions.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 9 illustrates an enlarged view of a portion of the splice arrangement of FIG. 7; and FIG. 10 illustrates an enlarged portion of the splice arrangement of FIG. 9;

DETAILED DESCRIPTION

Aspects of the present disclosure will be described more fully hereinafter with reference to the accompanying drawings, in which illustrative embodiments are shown. This disclosure may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
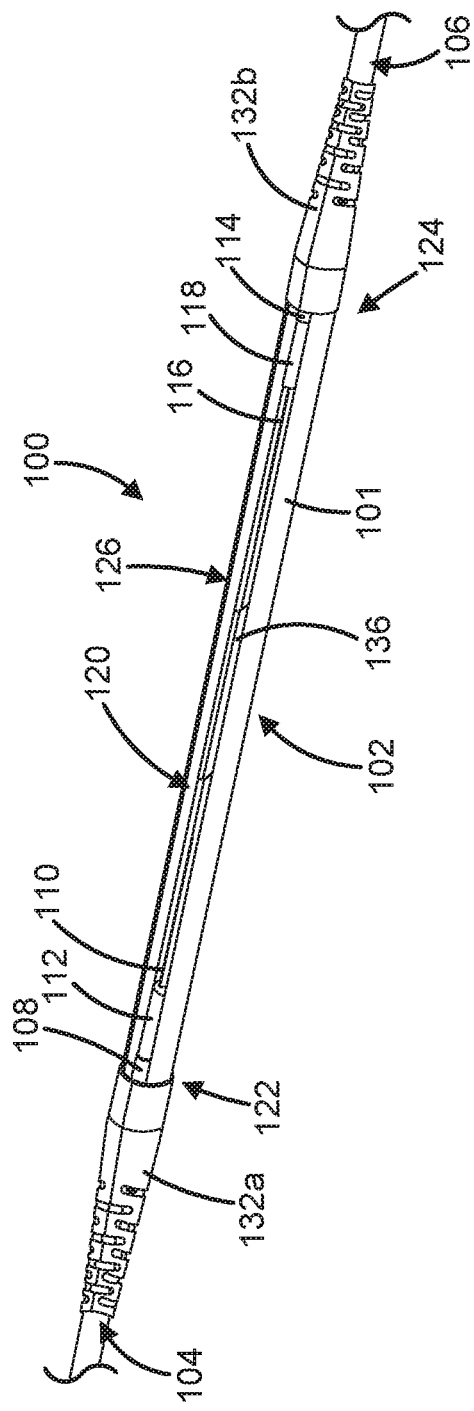
FIG. 1 illustrates a schematic, perspective view of an example splice arrangement including an elongate splice protection housing, strain relief boots, and fiber optic cables in accordance with principles of the present disclosure.
Figure 2:
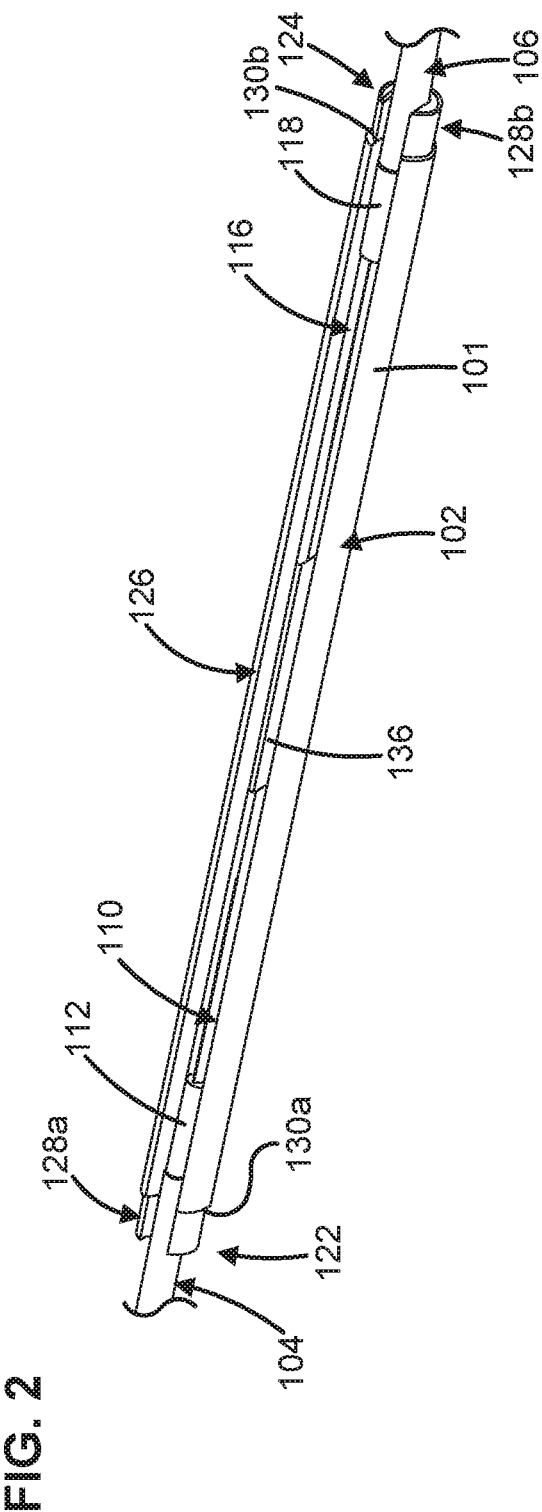
FIG. 2 illustrates a schematic, perspective view of the splice arrangement of FIG. 1 without the strain relief boots.
Figure 3:
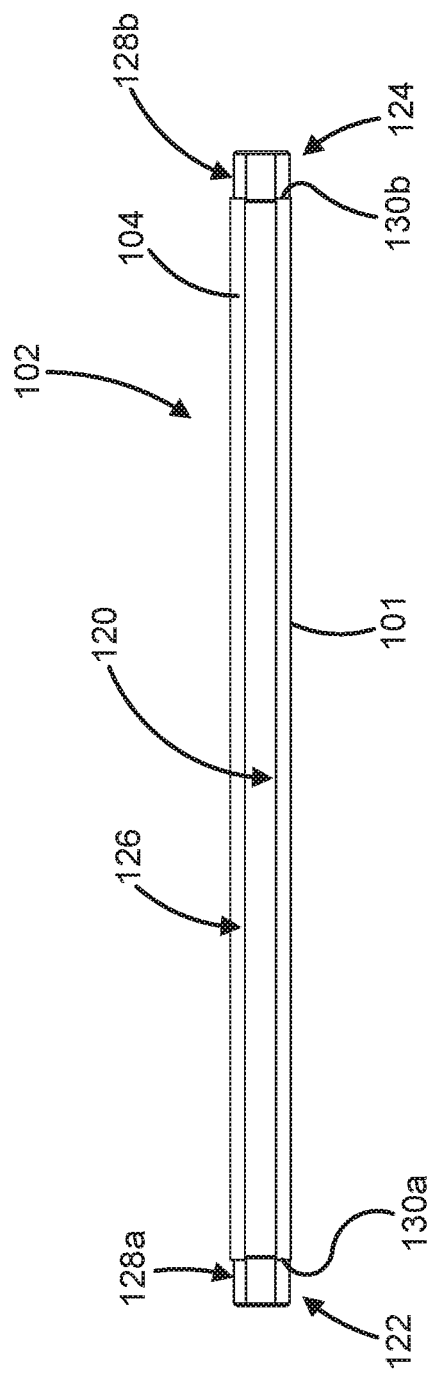
FIG. 3 illustrates a top view of the elongate splice protection housing of FIG. 1.
Figure 4:
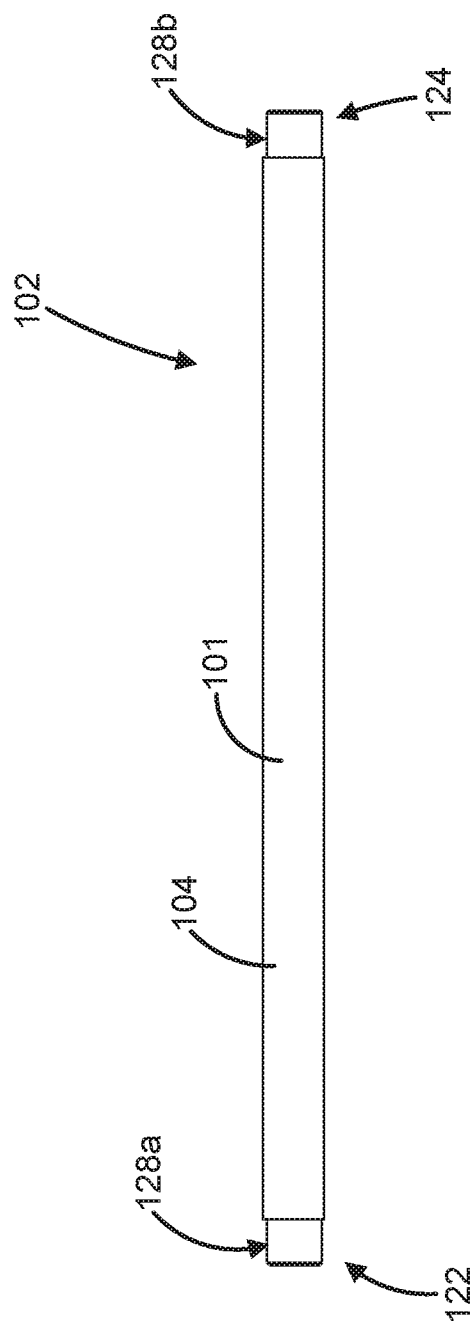
FIG. 4 illustrates a bottom view of the elongate splice protection housing of FIG. 3.
Figure 5:
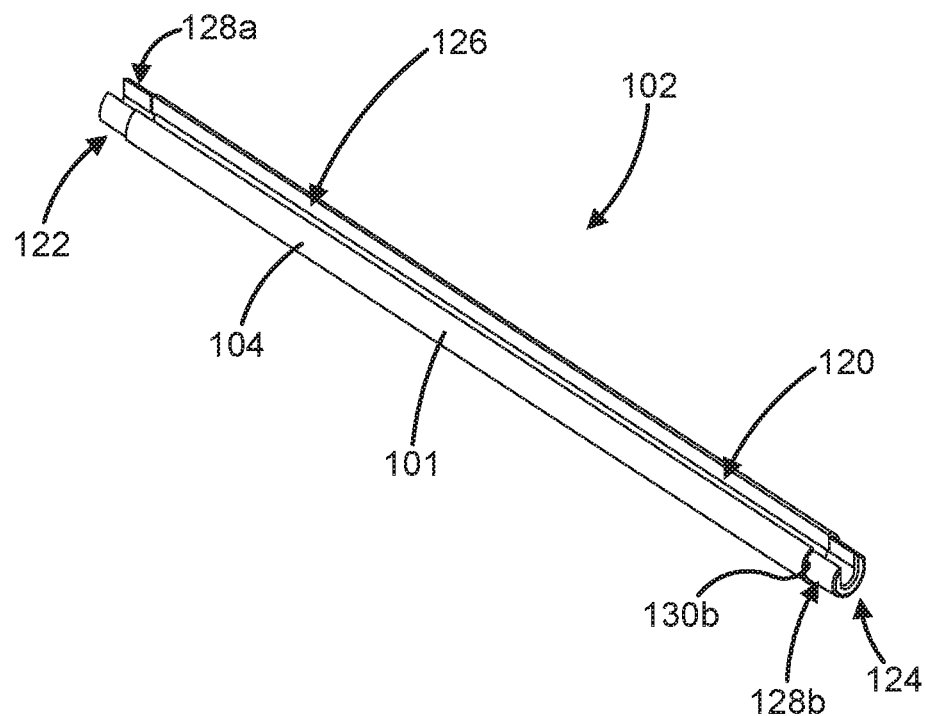
FIG. 5 illustrates a perspective view of the elongate splice protection housing of FIG. 3.

Referring to FIGS. 1-2, a schematic representation of an example splice arrangement 100 according to the disclosure is depicted. The splice arrangement 100 may include an elongate splice protection housing 102, a first fiber optic cable 104 (e.g., a single fiber or multi-fiber cable), and a second fiber optic cable 106 (e.g., a single fiber or multi-fiber cable). The first and second fiber optic cables 104, 106 may each have on the order of 12 to 48 fibers; however, alternative implementations may include fewer or more fibers.

The first fiber optic cable 104 may include a first jacket 108 that contains first optical fibers 110 (e.g., a first plurality of optical fibers) and a first fibrous reinforcing element 112. The second fiber optic cable 106 may include a second jacket 114 that contains second optical fibers 116 (e.g., a second plurality of optical fibers) and a second fibrous reinforcing element 118. The first and second fibrous reinforcing elements 112, 118 may include one or more strength members (e.g., aramid yarns, Kevlar) that respectively extend through the first and second jackets 108, 114.

In an example, the first and second fiber optic cables 104, 106 may be 3 millimeter cables (i.e., cables having an outer diameter of about 3 millimeters), although alternatives are possible. The first and second jackets 108, 114 may each contain between one and twelve optical fibers, although alternatives are possible.

Figure 6:
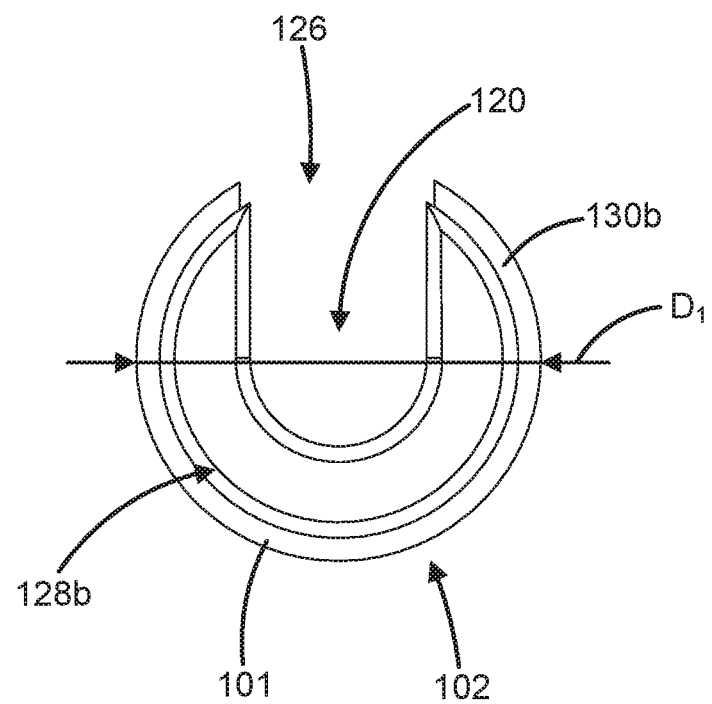
FIG. 6 illustrates an end view of the elongate splice protection housing of FIG. 3.
Figure 7:
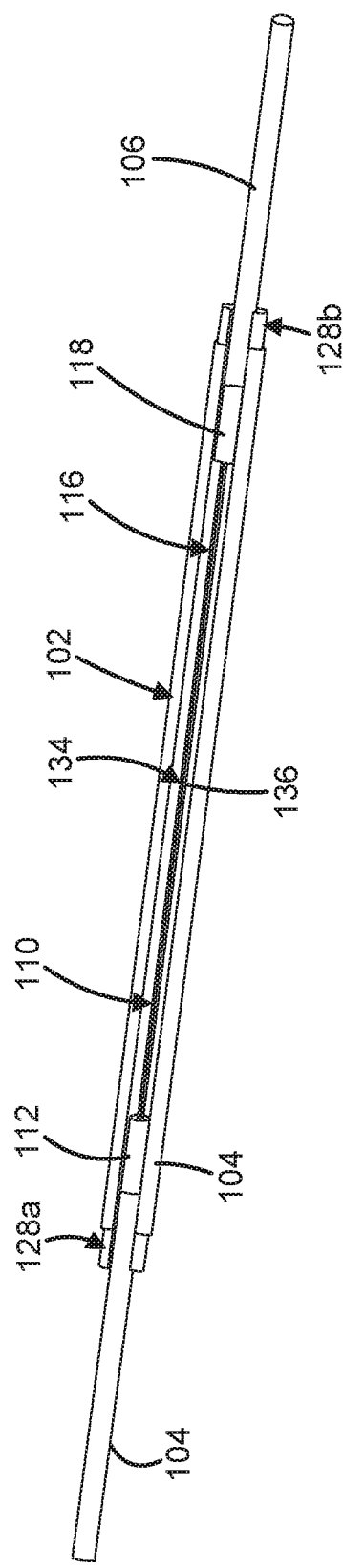
FIG. 7 illustrates a perspective view of the splice arrangement of FIG. 2.
Figure 8:
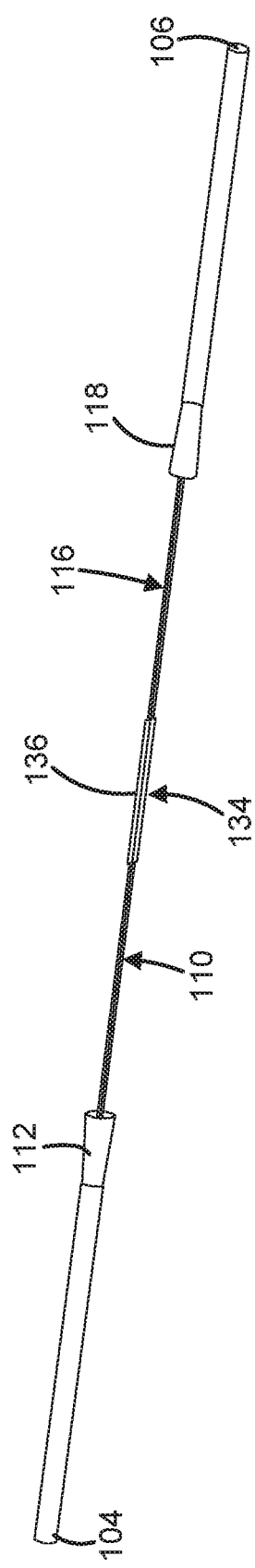
FIG. 8 illustrates a schematic, perspective view of the splice arrangement of FIG. 2 with the elongate splice protection housing removed.

In certain examples, the first optical fibers 110 and the second optical fibers 116 are arranged in a ribbon configuration. In an example, the ribbon configuration may be a standard ribbon configuration. In other examples, the ribbon configuration may be a loose ribbon configuration. That is, the first and second optical fibers 110, 116 may be structured to form loose ribbons. In still other examples, the first and second optical fibers 110, 116 may also be non-ribbonized and arranged in a loose tube configuration. The elongate splice protection housing 102 may have an outside diameter $D_1$ (cross-dimension)(see FIG. 6) and can be configured for receiving the first and second fiber optic cables 104, 106, although alternatives are possible.

As the term is used herein, a "loose ribbon" refers to a set of fibers that are loosely coupled together at various intervals along their length. Examples of loose ribbons are disclosed in U.S. Publication Nos. 2014/0112631, 2017/0235068, and 2017/0031121, the disclosures of which are hereby incorporated herein by reference. Other examples of loose ribbons of fibers include the Rollable Ribbons™ produced by OFS Furukawa of Norcross, Ga., the Spiderweb® Ribbon produced by AFL Telecommunications, LLC of Duncan, S.C., and the RocketRibbon® produced by Corning Optical Communications LLC of Hickory, N.C.

In certain examples, the first and second optical fibers 110, 116 may be a bare fiber, although alternatives are possible. In certain examples, the first and second optical fibers 110, 116 may be upjacketed, although alternatives are possible. In certain examples, the first and second optical fibers 110, 116 may be coated, although alternatives are possible. In certain examples, while in the field, there may be a need to splice optical fibers together. In certain examples, the elongate splice protection housing 102 may be factory or field installable. That is, the elongate splice protection housing 102 may be installed in the factory or in the field. The splice may be a mechanical splice or a fusion splice.

In one example, the splice arrangement 100 may be configured for field application to provide a quick and reliable installation or retrofit of fiber optic connectors onto the first and second optical fibers 110, 116, although alternatives are possible.

In certain examples, the first and second optical fibers 110, 116 are spliced together and adhesive material contained within the splice arrangement 100 can be cured. In certain examples, the adhesive material may be cured in no more than five minutes.

Referring to FIGS. 3-6, schematic views of the example elongate splice protection housing 102 is depicted. The elongate splice protection housing 102 may include a main body 101 that defines a channel 120 that extends lengthwise through the elongate splice protection housing 102 from a first end 122 of the elongate splice protection housing 102 to an opposite, second end 124 of the elongate splice protection housing 102. The channel 120 may have an open side 126 that extends from the first end 122 of the elongate splice protection housing 102 to the second end 124 of the elongate splice protection housing 102 so as to form a U-shaped transverse cross-sectional profile. The splice arrangement 100 can be configured to protect internal components against rain, wind, dust, rodents and other contaminants.

In one example, the elongate splice protection housing 102 may be formed from any suitable material with plastic being a desirable material. The elongate splice protection housing 102 may be made from a variety of materials, such as polypropylene. It will be appreciated that the elongate splice protection housing 102 can be made from, plastics, ceramics, acrylics, rubber, combinations thereof, or any other solid material.

In certain examples, the elongate splice protection housing 102 may define a first reduced-diameter portion 128a adjacent the first end 122 and a second reduced-diameter portion 128b adjacent the second end 124. The elongate splice protection housing 102 may also define stop shoulders 130a, 130b respectively positioned adjacent to the first and second reduced-diameter portions 128a, 128b.

The splice arrangement 100 may further include a first strain relief boot 132a (see FIG. 1) and a second strain relief boot 132b (see FIG. 1) that respectively mount at the first and second ends 122, 124 of the elongate splice protection housing 102. In one example, the first and second strain relief boots 132a, 132b respectively mount over the first and second reduced-diameter portions 128a, 128b of the elongate splice protection housing 102. When mounted over the elongate splice protection housing, the first and second strain relief boots 132a, 132b may abut against the stop shoulders 130a, 130b of the elongate splice protection housing 102. The first and second strain relief boots 132a, 132b may serve to provide bend radius protection to the first and second fiber optic cables 104, 106.

In certain examples, the first fiber optic cable 104 may be anchored to the first end 122 of the elongate splice protection housing 102 by bonding the first fibrous reinforcing element 112 to the first end 122 of the elongate splice protection housing 102. The second fiber optic cable 106 may be anchored to the second end 124 of the elongate splice protection housing 102 by bonding the second fibrous reinforcing element 118 to the second end 124 of the elongate splice protection housing 102. In one example, adhesive material (e.g., epoxy) may be used for bonding the first and second fibrous reinforcing elements 112, 118 at respective first and second ends 122, 124. That is, adhesive material may be utilized to lock the first and second fibrous reinforcing elements 112, 118 at both first and second ends 122, 124 of the elongate splice protection housing 102. Cable jackets can also be bonded in the housing 102. The cable jackets can be stripped from the reinforcing elements to expose strength members for bonding within the housing 102. In certain examples, the elongate splice protection housing 102 may be potted with adhesive material, although alternatives are possible.

Turning to FIGS. 7-10, the first optical fibers 110 and the second optical fibers 116 may be coupled together at a splice location generally shown at reference number 134. In one example, the splice location 134 may be positioned within the channel 120 at a center thereof.

The splice location 134 of the elongate splice protection housing 102 may include a splice reinforcing structure 136 (e.g., internal splice protector, laminate, tape, splice sleeve, tube) for protecting the splice location 134, although alternatives are possible. In certain examples, the elongate splice protection housing 102 may not include the splice reinforcing structure 136. That is, the elongate splice protection housing 102 may also work with only bare optical fiber ribbons. It will be appreciated that the splice arrangement 100 may satisfy industry standards, such as International Electrotechnical Commission (IEC) 61753-1, with or without the splice reinforcing structure 136.

In certain examples, the splice reinforcing structure 136 may be bonded or otherwise attached to or supported by the elongate splice protection housing 102. In certain examples, the elongate splice protection housing 102 may be optionally filled with adhesive (e.g., epoxy). That is, adhesive material may be contained within the channel 120 of the elongate splice protection housing 102 for encapsulating the first optical fibers 110 and the second optical fibers 116.

Figure 11:
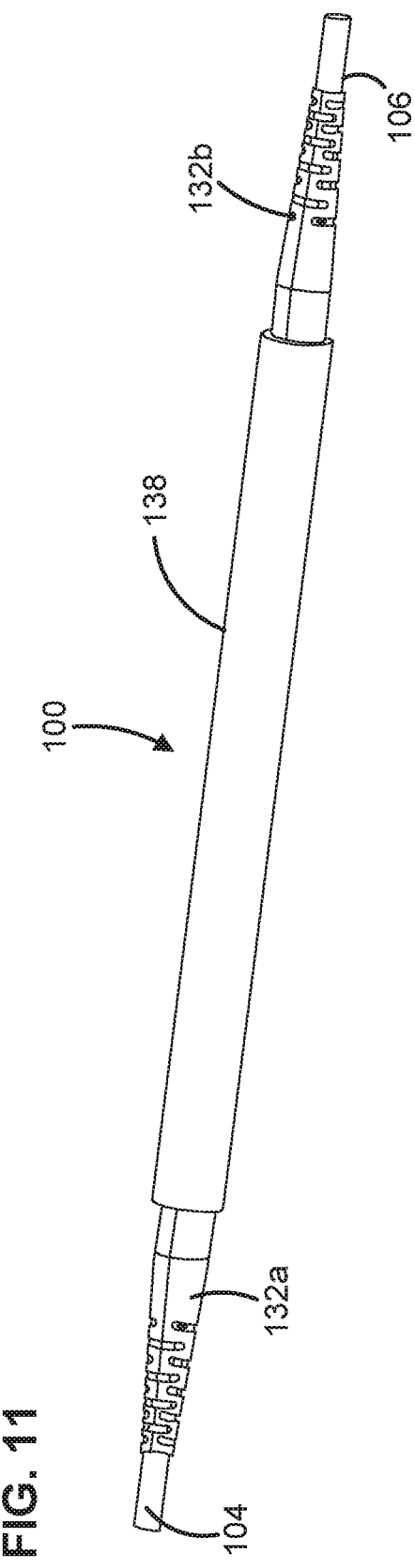
FIG. 11 illustrates a cover mounted over the splice arrangement of FIG. 1 in accordance with the principles of the present disclosure.
Figure 12:
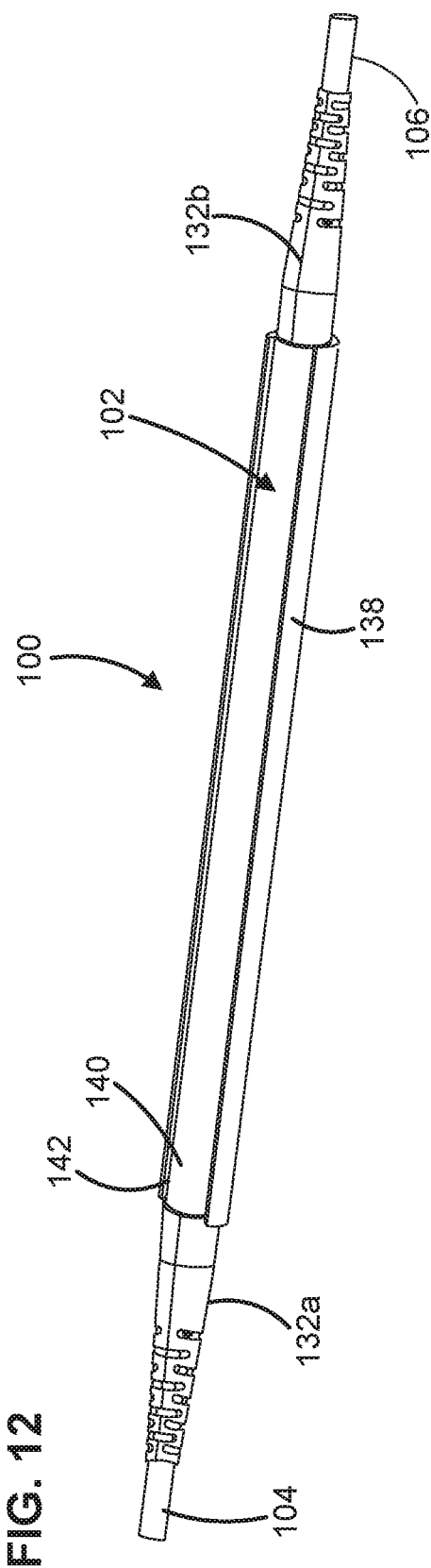
FIG. 12 illustrates an opposite, underside of the cover of FIG. 11.

Referring to FIGS. 11-12, the splice arrangement 100 may also include a cover 138 for covering the open side 126 of the channel 120. The cover 138 may be utilized when adhesive material is used for bonding the first and second fibrous reinforcing elements 112, 118 at respective first and second ends 122 to meet outside requirements.

The cover 138 may be configured as a flexible sleeve that defines a portion of a cylinder. The cover 138 may be adapted to snap over an exterior 140 of the elongate splice protection housing 102. The cover 138 may extend lengthwise over the elongate splice protection housing 102 from the first end 122 of the elongate splice protection housing 102 to the opposite, second end 124 of the elongate splice protection housing 102. In certain examples, the exterior 140 of the elongate splice protection housing 102 may have an exterior shape that matches an interior shape of an interior 142 of the cover 138 or flexible sleeve.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A splice arrangement comprising:
    an elongate splice protection housing defining a channel that extends lengthwise through the elongate splice protection housing from a first end of the splice protection housing to an opposite second end of the splice protection housing, the channel having an open side that extends from the first end of the splice protection housing to the second end of the splice protection housing;
    a first fiber optic cable including a first jacket containing first optical fibers and also containing a first fibrous reinforcing element, the first fiber optic cable being anchored to the first end of the splice protection housing by bonding the first fibrous reinforcing element to the first end of splice protection housing; and
    a second fiber optic cable including a second jacket containing second optical fibers and also containing a second fibrous reinforcing element, the second fiber optic cable being anchored to the second end of the splice protection housing by bonding the second fibrous reinforcing element to the second end of the splice protection housing, the first optical fibers and the second optical fibers being coupled together at a splice location positioned within the channel.

2. The splice arrangement of claim 1, wherein the first and second fibrous reinforcing elements include aramid yarn.

3. The splice arrangement of claim 1, further comprising a cover for covering the open side of the channel.

4. The splice arrangement of claim 3, wherein the cover snaps over an exterior of the elongate splice protection housing.

5. The splice arrangement of claim 4, wherein the cover is a flexible sleeve defining a portion of a cylinder, and wherein the exterior of the splice protection housing has an exterior shape that matches an interior shape of the flexible sleeve.

6. The splice arrangement of claim 1, further comprising an adhesive material contained within the channel for encapsulating the first optical fibers and the second optical fibers.

7. The splice arrangement of claim 1, further comprising first and second strain relief boots that respectively mount at the first and second ends of the splice protection housing.

8. The splice arrangement of claim 7, wherein the splice protection housing defines reduced-diameter portions adjacent the first and second ends over which the first and second boots mount, and wherein the splice protection housing defines stop shoulders adjacent the reduced-diameter portions against which the first and second strain relief boots abut.

9. The splice arrangement of claim 1, wherein the first optical fibers and the second optical fibers are arranged in a ribbon configuration.

10. The splice arrangement of claim 9, wherein the ribbon configuration is a standard ribbon configuration or a loose ribbon configuration.

11. The splice arrangement of claim 1, wherein the splice arrangement can satisfy industry standards with or without an internal splice protector.

12. The splice arrangement of claim 1, wherein the splice protector housing is factory or field installable.

* * * * *